(12) United States Patent
Yamada

(10) Patent No.: US 9,323,196 B2
(45) Date of Patent: Apr. 26, 2016

(54) IMAGE FORMING APPARATUS

(71) Applicant: KYOCERA Document Solutions Inc., Osaka (JP)

(72) Inventor: Yohei Yamada, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/089,165

(22) Filed: Nov. 25, 2013

(65) Prior Publication Data

US 2014/0147155 A1 May 29, 2014

(30) Foreign Application Priority Data

Nov. 29, 2012 (JP) ................. 2012-260894

(51) Int. Cl.
*G03G 15/00* (2006.01)
*G06F 3/12* (2006.01)

(52) U.S. Cl.
CPC .............. *G03G 15/50* (2013.01); *G06F 3/121* (2013.01); *G06F 3/1208* (2013.01); *G06F 3/1234* (2013.01); *G06F 3/1261* (2013.01); *G06F 3/1285* (2013.01)

(58) Field of Classification Search
USPC .......................................................... 399/82
See application file for complete search history.

(56) References Cited

U.S. PATENT DOCUMENTS

| | | | |
|---|---|---|---|
| 5,630,062 A | 5/1997 | Okutsu | |
| 6,930,796 B1 | 8/2005 | Matsuura et al. | |
| 7,180,623 B2 | 2/2007 | Kato | |
| 7,271,926 B2 | 9/2007 | Amemiya | |
| 7,304,753 B1 * | 12/2007 | Richter et al. | 358/1.15 |
| 8,144,348 B2 * | 3/2012 | Stevens et al. | 358/1.15 |
| 8,218,172 B2 | 7/2012 | Kato | |
| 2002/0012129 A1 | 1/2002 | Amemiya | |
| 2003/0202206 A1 | 10/2003 | Shinchi | |
| 2006/0066892 A1 * | 3/2006 | Wakamatsu et al. | 358/1.15 |
| 2008/0100710 A1 * | 5/2008 | Masumoto | H04N 1/00278 348/207.2 |

(Continued)

FOREIGN PATENT DOCUMENTS

| | | | |
|---|---|---|---|
| JP | 2000-127566 A | 5/2000 | |
| JP | 2001-166898 A | 6/2001 | |

(Continued)

OTHER PUBLICATIONS

The extended European search report issued by the European Patent Office on May 21, 2014 in the corresponding European patent application No. 13194571.9—7 pages.

(Continued)

*Primary Examiner* — Clayton E Laballe
*Assistant Examiner* — Linda B Smith
(74) *Attorney, Agent, or Firm* — Knobbe, Martens, Olson & Bear LLP

(57) ABSTRACT

An image forming apparatus includes an input unit, a printing unit, and a storage device. Printing data of each page included in a printing job is input into the input unit. The printing unit selectively prints a page which is printable without changing attributes of the printing data when input in the same apparatus, among the pages included in the printing job. The storage device stores the printing data of a page which is unprintable without changing the attributes of the printing data when input in the same apparatus, among the printing data of the pages included in the printing job as pending job data.

8 Claims, 5 Drawing Sheets

(56) References Cited

U.S. PATENT DOCUMENTS

| | | |
|---|---|---|
| 2008/0180711 A1 | 7/2008 | Ebuchi |
| 2010/0141986 A1* | 6/2010 | Utsubo ........................ 358/1.15 |
| 2010/0329720 A1* | 12/2010 | Otsuka ............................ 399/69 |
| 2011/0038002 A1* | 2/2011 | Nakamura et al. ........... 358/1.15 |
| 2011/0286046 A1* | 11/2011 | Ohsugi ........................ 358/3.01 |
| 2012/0237244 A1* | 9/2012 | Yoshikawa et al. ............. 399/67 |

FOREIGN PATENT DOCUMENTS

| | | |
|---|---|---|
| JP | 2003-167719 A | 6/2003 |
| JP | 2006-092165 A | 4/2006 |
| JP | 2009-223671 A | 10/2009 |
| JP | 2010-058352 A | 3/2010 |

OTHER PUBLICATIONS

Notice of Rejection mailed by Japan Patent Office on Feb. 17, 2015 in the corresponding Japanese patent application No. 2012-260894—4 pages.

* cited by examiner

IMAGE FORMING APPARATUS

INCORPORATION BY REFERENCE

This application claims priority to Japanese Patent Application No. 2012-260894 filed on Nov. 29, 2012, the entire contents of which are incorporated by reference herein.

BACKGROUND

The present disclosure relates to an image forming apparatus.

When a printing job is received, an image forming apparatus carries out printing based on printing data included in the printing job. To carry out the printing job on this image forming apparatus, attributes of the printing job (e.g., color and output size attributes) should be consistent with current conditions of the image forming apparatus that is a target to be used. For example, if only A4 size paper and not A3 size paper is housed in the image forming apparatus that is the target to be used, A4 size printing rather than A3 size printing can be carried out by the image forming apparatus that is the target to be used.

Therefore, an image forming apparatus is known in which, if the attributes of the printing job are discerned, and the discerned attributes are not consistent with current conditions of the same apparatus, implementation of the printing job is kept pending, and then a user is notified so as to change the current conditions of the same apparatus. For example, when no printing job can be carried out because the A3 size paper is not housed, notification requesting to change the housed paper is issued. Thereby, the user can carry out the pending printing job by changing the housed paper.

SUMMARY

Technology that further improves the aforementioned technologies is proposed as one aspect of the present disclosure.

An image forming apparatus according to one aspect of the present disclosure includes an input unit, a printing unit, and a storage device.

Printing data of each page included in a printing job is input into the input unit.

The printing unit selectively prints a page, which is printable without changing attributes of the printing data when input in the same apparatus, among the pages included in the printing job.

The storage device stores the printing data of a page, which is unprintable without changing the attributes of the printing data when input in the same apparatus, among the printing data of the pages included in the printing job as pending job data.

DETAILED DESCRIPTION

Hereinafter, with regard to an image forming apparatus according to an embodiment of the present disclosure, a monochrome multifunction device having a plurality of functions such as a copy function and a printer function will be described by way of example.

(Overall Constitution of an Image Forming Apparatus)

Figure 1:
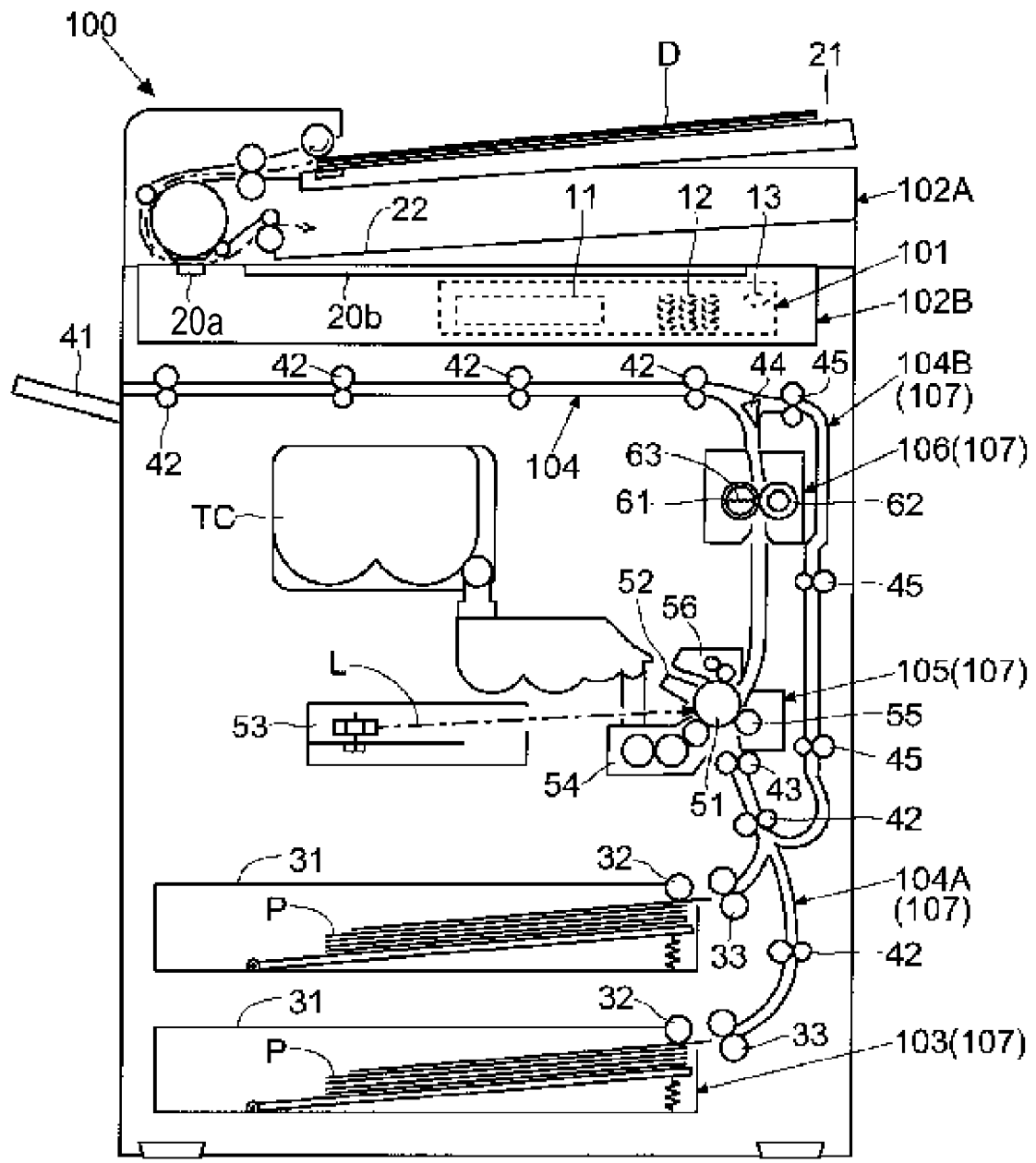
FIG. 1 is a schematic diagram of an image forming apparatus according to an embodiment of the present disclosure.

As shown in FIG. 1, the image forming apparatus 100 of the present embodiment includes an operation panel 101, a document conveying unit 102A, an image reading unit 102B, a paper feed unit 103, a paper conveying unit 104A, a double-side conveying unit 104B, an image forming unit 105, and a fixing unit 106. Among these, each of the paper conveying unit 104A, the double-side conveying unit 104B, the image forming unit 105, and the fixing unit 106 is a mechanical unit required to carry out a printing job, and corresponds to a "printing unit" of the present disclosure. In the following description, the paper conveying unit 104A, the double-side conveying unit 104B, the image forming unit 105, and the fixing unit 106 may be collectively referred to as the printing unit 107.

The operation panel 101 has a liquid crystal display unit 11 whose display face is covered with a touch panel. The liquid crystal display unit 11 displays various screens on which setting items whose setting values can be changed when the job is carried out, soft keys for changing the setting values of the setting items, and messages indicating conditions of the image forming apparatus 100 are disposed. Further, the operation panel 101 is provided with a numerical keypad 12 for receiving numerical input, and hard keys such as a start key 13 for receiving an instruction to carry out the job.

The document conveying unit 102A draws each document D set on a document set tray 21 to supply it to a document conveying path, and conveys the document toward a contact glass 20a for reading during conveyance to eject it to a document eject tray 22. Further, the document conveying unit 102A is openably mounted on the image reading unit 102B. Thereby, when the document D is placed on a contact glass 20b for reading during placement, the document D can be pressed by the document conveying unit 102A.

The image reading unit 102B allows monochrome and full-color scanning, and scans either the document D conveyed to a surface of the contact glass 20a for reading during conveyance or the document D placed on a surface of the contact glass 20b for reading during placement. The image reading unit 102B is provided with optical system members such as an exposure lamp, a mirror, lenses, and an image sensor, which are not shown. Thus, when the document D is located on the surface of the contact glass 20a for reading during conveyance or the surface of the contact glass 20b for reading during placement, light emitted from the exposure lamp is reflected by the document D, and is incident on the image sensor via the mirror and the lenses. The image sensor reads the reflected light from the document D, and outputs RGB signals as analog signals.

The RGB signals output from the image sensor as the analog signals are subjected to various processes by an analog/digital (A/D) converter and a compensator that are not shown. The A/D converter converts the RGB signals from the analog signals to digital signals, and outputs the digital signals to the compensator. The compensator performs shading compensation on the data from the A/D converter, and outputs the compensated data as printing data (in which the printing data is output to an image processing unit 113 to be described below).

The paper feed unit 103 has a paper cassette 31 in which paper P having a size of A4 is contained, and feeds the paper P contained in the paper cassette 31 to the paper conveying unit 104A. The paper feed unit 103 is provided with a pickup roller 32, which draws the paper P contained in the paper cassette 31, and a separation roller pair 33 for suppressing multi-feed of the paper P.

The paper conveying unit 104A conveys the paper P along a main conveying path in the order of the image forming unit 105 and the fixing unit 106, and finally guides the paper to an eject tray 41. The paper conveying unit 104A has a plurality of conveying roller pairs 42, each of which is rotatably installed on the main conveying path. Further, the paper conveying unit 104A has a resist roller pair 43 installed at an upstream side of the image forming unit 105 (just prior to reaching the image forming unit 105). The resist roller pair 43 causes the paper P to be on standby just before the image forming unit 105, and timing is measured to send the paper P to the image forming unit 105.

When double-side printing is carried out, the double-side conveying unit 104B conveys the paper P along a conveying path for the double-side printing. A switching unit 44 is provided at a branch point between the conveying path for the double-side printing and the main conveying path in order to guide the paper going through the fixing unit 106 to the conveying path for the double-side printing. Further, the conveying path for the double-side printing is provided with a plurality of conveying roller pairs 45 for conveying the paper P. When the double-side printing is carried out, and when the paper P goes through an installation position of the switching unit 44, the paper P is sent in the opposite direction. In this case, the switching unit 44 switches the conveying path of the paper P, and guides the paper P to the conveying path for the double-side printing. The paper P entering the conveying path for the double-side printing is conveyed by the plurality of conveying roller pairs 45, and arrives at an upstream side of the resist roller pair 43 again. Thereby, the front and back of the paper P are reversed, and the back side of the paper P can be printed.

The image forming unit 105 forms a toner image, and transfers the toner image to the paper P. The image forming unit 105 includes a photosensitive drum 51, a charger 52, an exposure device 53, a developing device 54, a transfer roller 55, and a cleaning device 56.

In the event of image formation, the photosensitive drum 51 is rotatably driven, and the charger 52 charges a surface of the photosensitive drum 51 at a predetermined potential. Further, the exposure device 53 has a light emitting device (not shown) outputting an optical beam L for exposure, and scans and exposes the surface of the photosensitive drum 51 while turning on/off the light emitting device. Thereby, an electrostatic latent image is formed on the surface of the photosensitive drum 51. The developing device 54 receives black toner from a toner container TC, and supplies the toner to the electrostatic latent image formed on the surface of the photosensitive drum 51, thereby developing the electrostatic latent image.

The transfer roller 55 is rotatably brought into contact with the surface of the photosensitive drum 51 under pressure. The resist roller pair 43 measures timing to cause the paper P to enter between the transfer roller 55 and the photosensitive drum 51. In this case, a transfer voltage is applied to the transfer roller 55. Thereby, the toner image of the surface of the photosensitive drum 51 is transferred to the paper P. Afterwards, the cleaning device 56 removes, for instance, the toner remaining on the surface of the photosensitive drum 51.

The fixing unit 106 causes the toner image transferred to the paper P to be fixed by heating and pressurizing the toner image. The fixing unit 106 includes a heating roller 61 and a pressurizing roller 62. The heating roller 61 has a built-in heater 63. The pressurizing roller 62 comes into contact with the heating roller 61 under pressure. The paper P to which the toner image is transferred is heated and pressurized by passing between the heating roller 61 and the pressurizing roller 62. Thereby, the toner image is fixed to the paper P, and the printing is completed. Afterwards, the printed paper P is sent to the eject tray 41 by the conveying roller pair 42.

(Hardware Constitution of the Image Forming Apparatus)

Figure 2:
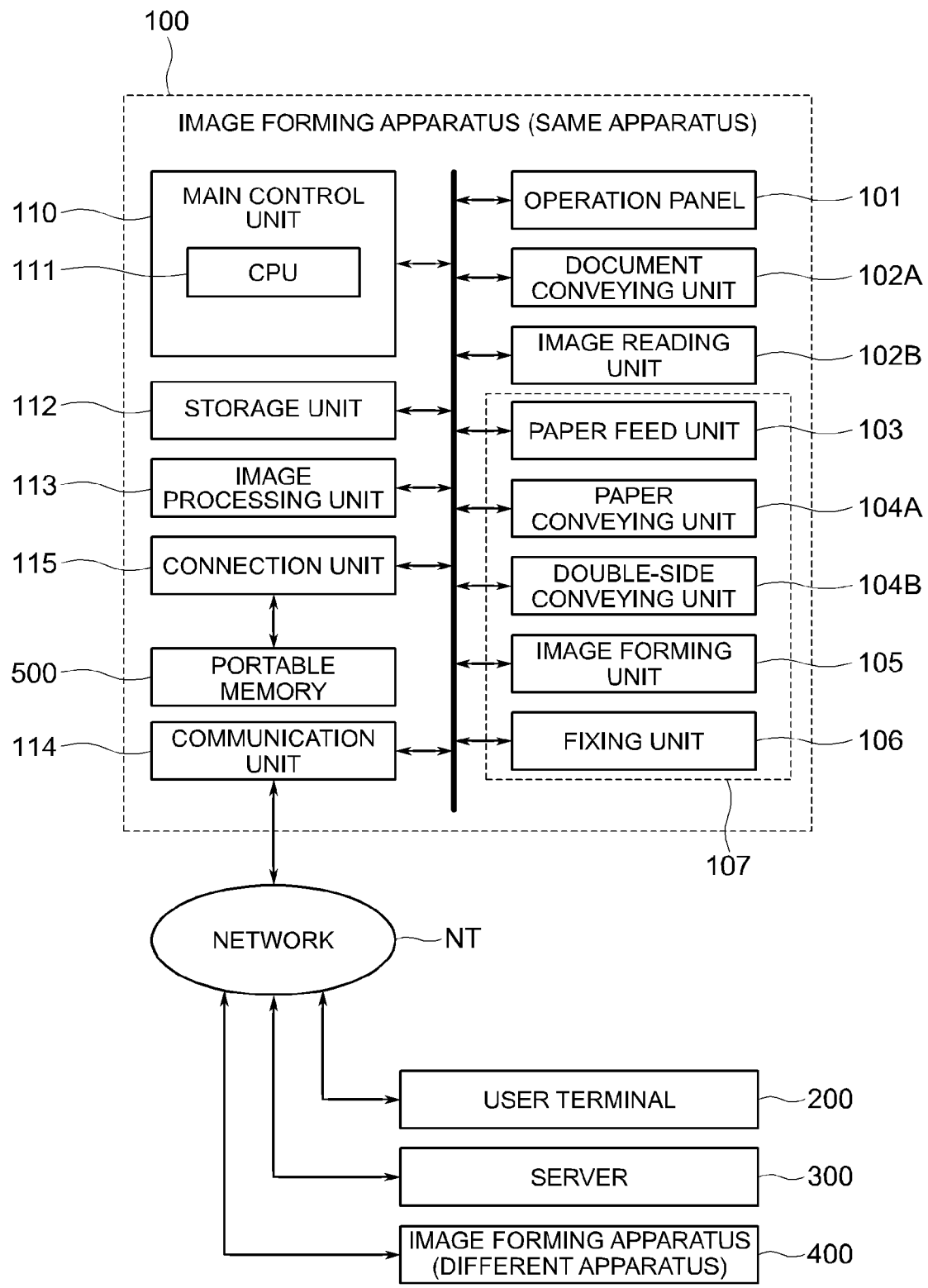
FIG. 2 is a block diagram for describing a hardware constitution of the image forming apparatus shown in FIG. 1.

As shown in FIG. 2, the image forming apparatus 100 is equipped with a main control unit 110 including a central processing unit (CPU) 111. The main control unit 110 is connected to the operation panel 101, the document conveying unit 102A, the image reading unit 102B, the paper feed unit 103, the paper conveying unit 104A, the double-side conveying unit 104B, the image forming unit 105, and the fixing unit 106. Further, the main control unit 110 is connected to a storage unit 112 including a read-only memory (ROM), a random-access memory (RAM), and a hard disk drive (HDD). The storage unit 112 stores, for instance, programs and data required to carry out the job in the ROM, and deploys the programs and the data to the RAM. The main control unit 110 controls each unit of the image forming apparatus 100 based on the programs and the data stored in the storage unit 112.

Further, the main control unit 110 is connected to an image processing unit 113. The image processing unit 113 includes an application-specific integrated circuit (ASIC) or a memory dedicated to image processing. Printing data of each page which is included in the printing job transmitted from a user terminal 200 to be described below is input to the image processing unit 113 (transmitted from a communication unit 114 to be described below). Alternatively, printing data of each page which is included in the printing job transmitted from the image reading unit 102B is input to the image processing unit 113. In other words, the image processing unit 113 corresponds to an "input unit" of the present disclosure. The image processing unit 113 performs various types of image processing (expansion/contraction and gray scale transform) on the printing data of each page which is included in the printing job, converts the printing data undergoing the image processing into data for exposure (data for turning on/off the light emitting device of the exposure device 53), and outputs the converted data to a printing unit 107 (an exposure device 53 of the image forming unit 105).

Further, the main control unit 110 is connected to the communication unit 114. The communication unit 114 is connected to the user terminal 200 such as a personal computer via a network NT. Thereby, it is possible to perform printing based on the printing data (e.g., page description language (PDL) data) transmitted from the user terminal 200 and to transmit scan data obtained by scanning to the user terminal 200.

Furthermore, the communication unit 114 is connected to a server 300 via the network NT. The server 300 is also connected to an image forming apparatus (e.g., an image forming apparatus 400) other than the image forming apparatus 100 via the network NT. The server 300 manages and maintains various pieces of information of all the image forming apparatuses (including the image forming apparatuses 100 and 400) within the network NT. The image forming apparatus (e.g., the image forming apparatus 400) other than the image forming apparatus 100 connected to the network NT may be a copier, a printer, or a multifunction device. Further, the image forming apparatus (e.g., the image forming apparatus 400) may be a monochrome apparatus or a color apparatus.

The main control unit 110 instructs the communication unit 114 to obtain information indicating conditions of the different apparatus (e.g., the image forming apparatus 400) other than the same apparatus. For example, the main control unit 110 obtains information indicating a residual quantity of toner housed in the different apparatus. Alternatively, the main control unit 110 may obtain information indicating a size and residual quantity of paper housed in the different apparatus. Otherwise, the main control unit 110 may obtain information indicating whether the different apparatus is a monochrome apparatus or a color apparatus.

Further, the image forming apparatus 100 is equipped with a connection unit 115 for mounting a portable memory 500 such as a Universal Serial Bus (USB) memory (corresponding to a "storage device" of the present disclosure). Thus, it is possible to carry out printing based on the printing data stored in the portable memory 500 and to transmit scan data obtained by scanning to the portable memory 500. The portable memory 500 may be removed from the connection unit 115 and be mounted on, for instance, the different apparatus (e.g., the image forming apparatus 400) as well.

(Discerning Whether or not the Printing is Possible)

The image processing unit 113 (or the main control unit 110) discerns a page which cannot be printed without changing the attributes of the printing data when input in the same apparatus among pages included in a single printing job (i.e., discerns whether or not a color and size of an image of the page which are based on the printing data when input in the same apparatus can be reproduced).

To be specific, when the printing job (PDL data), to which print setting information indicating color and output size attributes (a size of paper to be printed) of the printing data of each page is added, is transmitted from the user terminal 200, the image processing unit 113 discerns whether or not each page included in the printing job can be printed.

Here, since the image forming apparatus 100 is the monochrome apparatus, a color image cannot be printed. For this reason, with regard to each page included in the printing job, the image processing unit 113 discerns which of "color" and "monochrome" is the color attribute of the printing data when input. With regard to the page in which the color attribute of the printing data when input is "color" among the pages included in the printing job, the image processing unit 113 determines that the page cannot be printed without changing the attributes of the printing data when input in the same apparatus. With regard to the page in which the color attribute of the printing data when input is "monochrome," the image processing unit 113 determines that the page can be printed without changing the attributes of the printing data when input in the same apparatus.

Furthermore, even when the printing data obtained by scanning is transmitted as the printing job from the image reading unit 102B, the image processing unit 113 discerns whether or not each page included in the printing job can be printed.

In this case, the image processing unit 113 counts color pixels, for instance in each page included in the printing job, and determines that the color attribute of the printing data of the page in which the color pixels is equal to or more than a predetermined number is "color," and that the color attribute of the printing data of the pages other than this page is "monochrome." With regard to the page in which the color attribute of the printing data when input is "color" among the pages included in the printing job, the image processing unit 113 determines that the page cannot be printed without changing the attributes of the printing data when input in the same apparatus. With regard to the page in which the color attribute of the printing data when input is "monochrome," the image processing unit 113 determines that the page can be printed without changing the attributes of the printing data when input in the same apparatus.

Further, only a paper cassette 31, in which the paper P having an A4 size is contained, is mounted in the image forming apparatus 100. Accordingly, in the image forming apparatus 100, a printout of sizes other than the A4 size cannot be carried out. For this reason, the image processing unit 113 discerns the output size attribute (the size of paper to be printed) of the printing data when input with regard to each page included in the printing job. With regard to the page in which the output size attribute of the printing data when input among the pages included in the printing job is a size other than the "A4 size," the image processing unit 113 determines that the page cannot be printed without changing the attributes of the printing data when input in the same apparatus. With regard to the page in which the output size attribute of the printing data when input among the pages included in the printing job is the "A4 size," the image processing unit 113 determines that the page can be printed without changing the attributes of the printing data when input in the same apparatus.

However, when the black toner contained in the toner container TC is insufficient, the image processing unit 113 determines that, although the color attribute of the printing data when input is "monochrome," the page cannot be printed in the same apparatus without changing the color attribute of the printing data when input. Further, when the A4 size paper P contained in the paper cassette 31 is insufficient, the image processing unit 113 determines that, although the output size attribute of the printing data when input is the "A4 size," the page cannot be printed in the same apparatus without changing the output size attribute of the printing data when input.

With regard to the printing data of the page determined to be printable without changing the attributes of the printing data when input in the same apparatus among the printing data of the pages included in the single printing job, the image processing unit 113 performs various types of image processing, converts the printing data after the image processing into data for exposure (data for turning on/off the light emitting device of the exposure device 53), and outputs the converted data to the printing unit 107 (the exposure device 53 of the image forming unit 105). Therefore, the printing unit 107 selectively prints the page which can be printed without changing the attributes of the printing data when input in the same apparatus among the pages included in the printing job.

On the other hand, with regard to the printing data of the page determined as being unprintable without changing the attributes of the printing data when input in the same apparatus among the printing data of the pages included in the single printing job, the image processing unit 113 transmits such printing data to the portable memory 500 without outputting such printing data to the printing unit 107, and stores the transmitted printing data in the portable memory 500 (stores them in units of pages rather than printing jobs). In other words, the portable memory 500 stores the printing data of the page (also including the unprintable page because at least one of the toner and the paper required for the printing is deficient (insufficient)) that cannot be printed without changing the attributes of the printing data when input in the same apparatus, among the printing data of the pages included in the single printing job, as pending job data. For example, the image processing unit 113 converts the printing data as the pending job data into raster data, and stores the converted data in the portable memory 500 along with the print setting information.

When the printing unit 107 carries out double-side printing, and if the image processing unit 113 determines that the page to be printed on one side can be printed without changing the attributes of the printing data when input in the same apparatus and that the page to be printed on the other side cannot be printed without changing the attributes of the printing data when input in the same apparatus, the printing data of each of the page to be printed on one side and the page to be printed on the other side is stored in the portable memory 500 as the pending job data.

(Conversion of the Pending Job Data)

Figure 3:
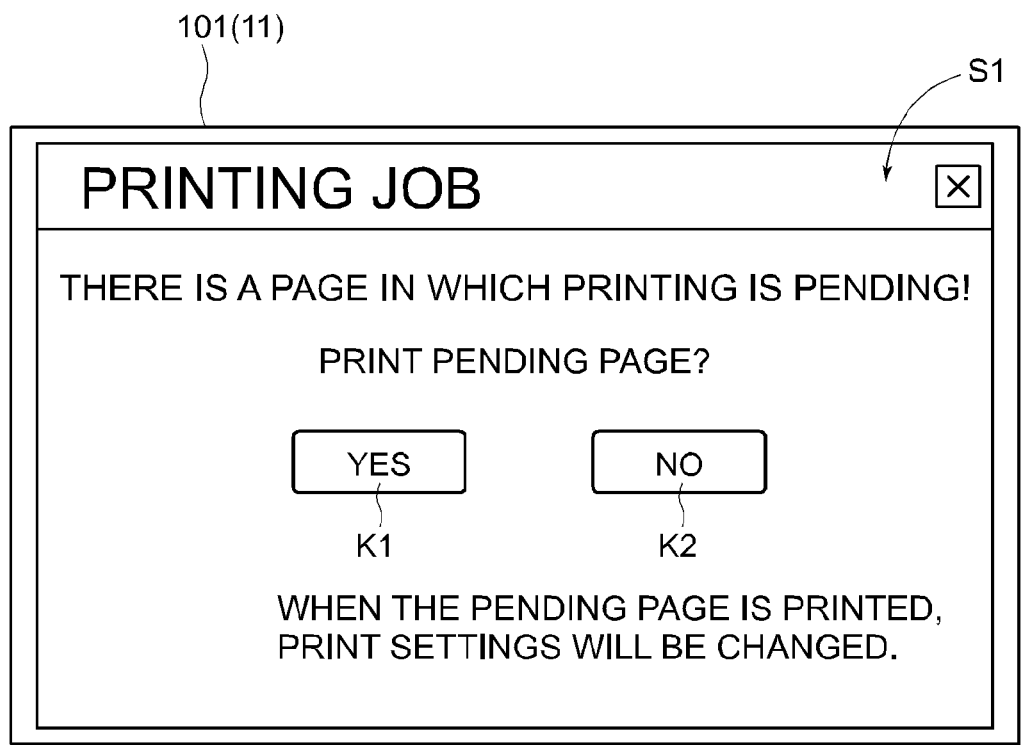
FIG. 3 is a diagram for describing an example of a screen displayed on the image forming apparatus shown in FIG. 1 (a screen for receiving confirmation of whether or not printing based on pending job data is carried out).

When the pending job data is stored in the portable memory 500, the operation panel 101 receives confirmation of whether or not to carry out the printing based on the pending job data in the same apparatus from a user. In this case, the operation panel 101 corresponds to a "reception unit" of the present disclosure. The operation panel 101 displays a reception screen S1 as shown in FIG. 3, and receives a printing instruction based on the pending job data from the user. On the reception screen S1, for instance, a "YES" key K1 for receiving intent to carry out the printing based on the pending job data and a "NO" key K2 receiving intent not to carry out the printing based on the pending job data are disposed.

The user can instruct the image forming apparatus 100 to carry out the printing based on the pending job data from the user terminal 200. In this case, the communication unit 114 connected to the user terminal 200 corresponds to the "reception unit" of the present disclosure.

When receiving intent to carry out the printing based on the pending job data, the image processing unit 113 reads the pending job data out of the portable memory 500, and performs various types of image processing on the pending job data. Here, the image processing unit 113 converts an attribute of the pending job data into an attribute by which the printing can be carried out in the same apparatus. For example, the image processing unit 113 converts a color attribute of the pending job data into a "monochrome" and converts a color image into a gray scale image. Alternatively, the image processing unit 113 converts an output size attribute of the pending job data into an "A4 size" and enlarges or contracts image data. Then, the image processing unit 113 converts image-processed printing data, whose attribute is converted into the attribute by which the printing can be carried out in the same apparatus, into data for exposure, and outputs the converted data to the printing unit 107. In other words, when receiving an instruction to carry out the printing based on the pending job data, the printing unit 107 carries out the printing based on the printing data obtained by converting the attribute of the pending job data into the attribute by which the printing can be carried out in the same apparatus.

(Induction to the Image Forming Apparatus in which the Printing Based on the Pending Job Data is Possible)

A certain user may want to carry out the printing without converting the attribute of the pending job data into a separate attribute. For this reason, when the pending job data is stored in the portable memory 500, and when the printing based on the pending job data can be carried out in the different apparatus, the operation panel 101 makes a notification for inducing a user to the different apparatus in which the printing based on the pending job data is possible. In this case, the operation panel 101 corresponds to a "notification unit" of the present disclosure.

Figure 4:
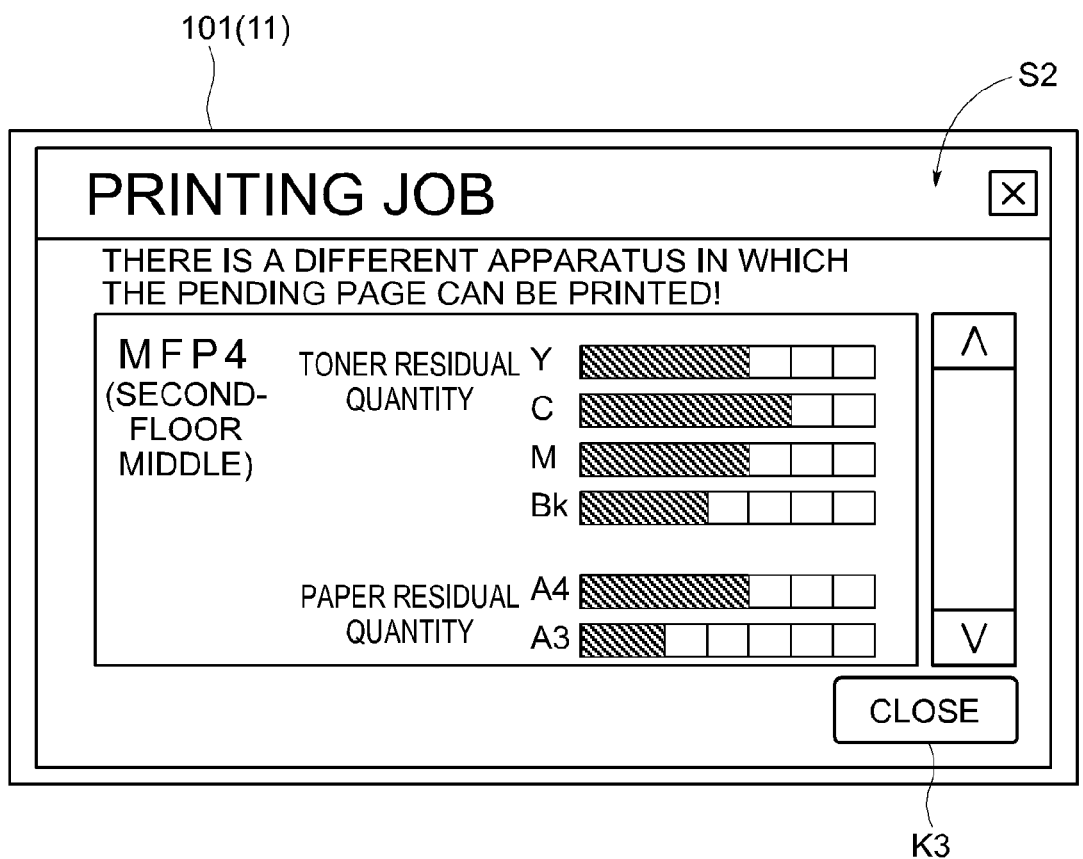
FIG. 4 is a diagram for describing another example of the screen displayed on the image forming apparatus shown in FIG. 1 (a screen for notifying that a different apparatus in which the printing based on the pending job data is carried out is present).

The operation panel 101 displays a notification screen S2 as shown in FIG. 4. For example, in the image forming apparatus 400 that is the different apparatus, the printing based on the pending job data is assumed to be able to be carried out. In this case, the operation panel 101 arranges information, which indicates an identifier of the image forming apparatus 400 (assumed to be "MFP4" in FIG. 4) and an installation site of the image forming apparatus 400 (assumed to be "second-floor middle" in FIG. 4), within the notification screen S2.

However, in some cases, at least one of the toner and the paper required for the printing based on the pending job data may be insufficient. For this reason, information indicating residual quantities of the toner and the paper is also added to the notification screen S2. If the toner required for the printing based on the pending job data is insufficient, a message requesting supplementation of the toner is displayed. If the paper required for the printing based on the pending job data is insufficient, a message requesting supplementation of the paper is displayed.

For example, when the "NO" key K2 of the reception screen S1 is touched by a user, the operation panel 101 displays the notification screen S2. Alternatively, when the notification screen S2 is displayed first, and a "CLOSE" key K3 is touched by a user, the reception screen S1 may be set to be displayed. Further, the reception screen S1 and the notification screen S2 may be repetitively displayed at given intervals in turn. Further, display contents of each of the reception screen S1 and the notification screen S2 may be offered within the same screen. In addition, the display of the reception screen S1 may be set to be omitted (only the notification screen S2 may be set to be displayed), and the display of the notification screen S2 may be set to be omitted (only the reception screen S1 may be set to be displayed).

(Flow of Carrying Out the Printing Job)

Hereinafter, a flow of carrying out the printing job will be described according to a flow chart shown in FIG. 5.

Figure 5:
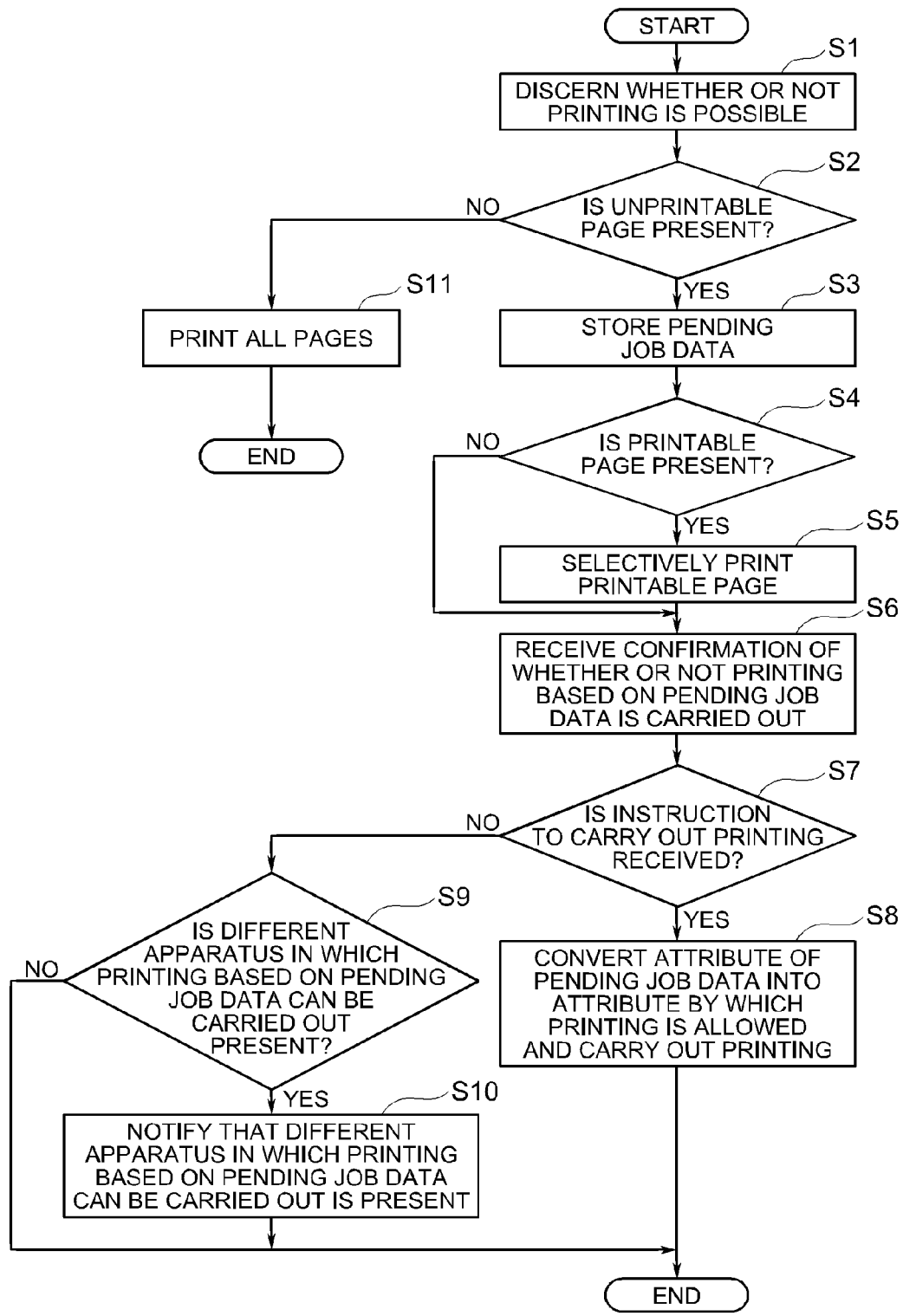
FIG. 5 is a flow chart for describing an operation of performing a printing job in the image forming apparatus shown in FIG. 1.

First, the flow chart of FIG. 5 starts when the printing data is sent from the user terminal 200, and then the printing data is transmitted to the image processing unit 113. Alternatively, the flow chart of FIG. 5 may start when scanning is performed by the image reading unit 102B, and then scan data is sent to the image processing unit 113 as the printing data.

In step S1, the main control unit 110 instructs the image processing unit 113 to discern between the printing data of the page that cannot be printed without changing the attributes of the printing data when input in the same apparatus and the printing data of the page that can be printed without changing the attributes of the printing data when input (discerning whether or not the printing is possible), among the printing data of the pages included in the single printing job.

In step S2, on the basis of a result of the image processing unit 113 discerning whether or not the printing is possible, the main control unit 110 determines whether or not the page that cannot be printed without changing the attributes of the printing data when input in the same apparatus is present. As a result, if the unprintable page is present, the process proceeds to step S3. When the process proceeds to step S3, the main control unit 110 instructs the image processing unit 113 to store the printing data of the page which cannot be printed without changing the attributes of the printing data when input in the same apparatus in the portable memory 500 as the pending job data.

In step S4, on the basis of a result of the image processing unit 113 discerning whether or not the printing is possible, the main control unit 110 determines whether or not the page that can be printed without changing the attributes of the printing data when input in the same apparatus is present. As a result, if the printable page is present, the process proceeds to step S5.

When the process proceeds to step S5, the main control unit 110 instructs the image processing unit 113 to convert the printing data of the page, which can be printed without changing the attributes of the printing data when input in the same apparatus, into data for exposure so as to output the data for exposure to the printing unit 107. Then, the main control unit 110 instructs the printing unit 107 to selectively print the page which can be printed without changing the attributes of the printing data when input in the same apparatus, among the pages included in the printing job. Afterwards, the process proceeds to step S6. In step S4, even when the main control unit 110 determines that the printable page is not present, the process proceeds to step S6.

When the process proceeds to step S6, the main control unit 110 instructs the operation panel 101 to receive confirmation of whether or not to carry out the printing based on the pending job data in the same apparatus. For example, the operation panel 101 displays the reception screen S1 as shown in FIG. 3. Subsequently, in step S7, the main control unit 110 determines whether or not it has received an instruction of intent to carry out the printing based on the pending job data in the same apparatus.

In step S7, when the main control unit 110 determines that the instruction of intent to carry out the printing is received, the process proceeds to step S8. When the process proceeds to step S8, the main control unit 110 instructs the image processing unit 113 to convert the attribute of the pending job data into an attribute by which the printing can be carried out in the same apparatus so as to output the converted attribute to the printing unit 107. Then, the main control unit 110 instructs the printing unit 107 to carry out the printing based on the printing data that converts the attribute of the pending job data into the attribute by which the printing can be carried out in the same apparatus.

Further, in step S7, when the main control unit 110 determines that the instruction of intent to carry out the printing is not received, the process proceeds to step S9. When the process proceeds to step S9, the main control unit 110 determines whether or not the different apparatus in which the printing based on the pending job data can be carried out is present. As a result, if the different apparatus in which the printing based on the pending job data can be carried out is present, the process proceeds to step S10. Then, the main control unit 110 instructs the operation panel 101 to notify that the different apparatus in which the printing based on the pending job data can be carried out is present. For example, the operation panel 101 notifies through the notification screen S2 as shown in FIG. 4.

In contrast, in step S9, when the main control unit 110 determines that the different apparatus in which the printing based on the pending job data can be carried out is not present, the process is terminated without displaying the notification screen S2. Alternatively, the reception screen S1 may be displayed again. That is, the process may proceed to step S6.

In step S2, when the main control unit 110 determines that all the pages are pages that can be printed without changing the attributes of the printing data when input in the same apparatus, the process proceeds to step S11. When the process proceeds to step S11, the main control unit 110 instructs the printing unit 107 to print all the pages included in the printing job.

In step S5, the page which can be printed without changing the attributes of the printing data when input in the same apparatus is set to be selectively printed. However, the page may be set to be printed after step S7 without being printed at that point in time. In detail, in the case of proceeding from step S7 to step S8, when the printing is carried out by converting the attribute of the pending job data into the attribute by which the printing can be carried out in the same apparatus, the page that can be printed without changing the attributes of the printing data when input in the same apparatus may be printed together. Further, in step S7, when the main control unit 110 determines that the instruction of intent to carry out the printing is not received, the page that can be printed without changing the attributes of the printing data when input in the same apparatus may be selectively printed.

As described above, the image forming apparatus 100 of the present embodiment is equipped with the image processing unit (input unit) 113 into which the printing data of each page included in the printing job is input, the printing unit 107 that selectively prints the page which can be printed without changing the attributes of the printing data when input in the same apparatus, among the pages included in the printing job, and the portable memory (storage device) 500 that stores the printing data of the page that cannot be printed without changing the attributes of the printing data when input in the same apparatus among the printing data of the pages included in the printing job as the pending job data. For example, the portable memory 500 stores, among the printing data of the pages included in the printing job, the printing data of the page which has the color attribute by which the printing cannot be carried out in the same apparatus, the printing data of the page which has the output size attribute by which the printing cannot be carried out in the same apparatus, and the printing data of the page that cannot be printed without changing the attributes of the printing data when input in the same apparatus because at least one of the toner and the paper required for the printing is deficient as the pending job data.

With the constitution of the present embodiment, the printing unit 107 selectively prints the page that can be printed without changing the attributes of the printing data when input in the same apparatus among the pages included in the printing job. In other words, even when the unprintable page is included in the printing job, the printing unit 107 does not defer the printing job itself and selectively prints the printable page. In detail, since the image forming apparatus 100 is the monochrome apparatus (without corresponding to the printing of the color image), if the pages for the color and the monochrome are mixed within the printing job, the page for the color is not printed, but the page for the monochrome is selectively printed. For example, since the image forming apparatus 100 is an A4 size dedicated apparatus (without corresponding to the A3 size printing), if the pages for the A3 size and the A4 size are mixed within the printing job, the page for the A3 size is not printed, but the page for the A4 size is selectively printed. Thus, the convenience of a user is improved.

Furthermore, according to the constitution of the present embodiment, the portable memory 500 stores, among the printing data of the pages included in the printing job, the printing data of the page that cannot be printed without changing the attributes of the printing data when input in the same apparatus as the pending job data. Thus, the portable memory 500 is mounted on the different apparatus in which the printing based on the pending job data can be carried out, and thereby the printing based on the pending job data can be carried out in the different apparatus. Alternatively, the pending job data stored in the portable memory 500 may be sent to the different apparatus via the network NT, and thereby the printing based on the pending job data can be carried out in the different apparatus. Further, what is stored in the portable memory 500 as the pending job data is limited to the printing data of the unprintable page within the printing job, but not the entire printing job. As such, it is possible to suppress the size of the pending job data.

Further, in the present embodiment, as described above, the operation panel (reception unit) 101 receives the instruction to carry out the printing based on the pending job data. When the operation panel 101 receives the instruction to carry out the printing based on the pending job data, the printing unit 107 carries out the printing based on the printing data obtained by converting the attribute of the pending job data into the attribute by which the printing can be carried out in the same apparatus. Thereby, from the viewpoint of a user, the convenience is good, because even though the attribute is changed from some pages, the printing of all the pages included in the printing job can be completed by the image forming apparatus 100.

Further, in the present embodiment, as described above, when the printing based on the pending job data can be carried out in the different apparatus (e.g., the image forming apparatus 400) other than the same apparatus, the operation panel (notification unit) 101 notifies that the printing based on the pending job data can be carried out in the image forming apparatus 400. Thereby, from the viewpoint of a user, the convenience is good, because it is not necessary to search for the different apparatus other than the same apparatus in which the printing based on the pending job data can be carried out.

Further, in the present embodiment, as described above, when the printing unit 107 carries out the double-side printing, if the page to be printed on one side can be printed without changing the attributes of the printing data when input in the same apparatus, and the page to be printed on the other side cannot be printed without changing the attributes of the printing data when input in the same apparatus, the portable memory 500 stores the printing data of each of the page to be printed on one side and the page to be printed on the other side as the pending job data. Thereby, there occurs no disadvantage that the paper P printed on one side is output when carrying out the double-side printing.

Further, in the present embodiment, as described above, the pending job data is stored in the portable memory 500 that can be removed from the connection unit 115 and be connected to the different apparatus other than the same apparatus. Thereby, from the viewpoint of a user, the printing based on the pending job data can be easily carried out in the different apparatus. For example, if the printing based on the pending job data can be easily carried out in the image forming apparatus 400, the portable memory 500 need only be removed from the image forming apparatus 100 and mounted on the image forming apparatus 400.

Further, in the present embodiment, as described above, the communication unit 114 is provided for connection to the network NT. The communication unit 114 obtains the information about the toner and the paper housed in the different apparatus that excludes the same apparatus and is connected to the network NT. Thereby, it is possible to easily search for the different apparatus that excludes the same apparatus and can carry out the printing based on the pending job data.

Further, in the present embodiment, as described above, in addition to the printing data of the unprintable page, the portable memory 500 stores the print setting information of the printing data as the pending job data. Since the print setting information indicating the color attribute and the output size attribute (paper size to be printed) of the printing data of each page is stored in the portable memory 500, the portable memory 500 is mounted on the different apparatus, and thereby the printing of the printing data based on the print setting information can be carried out in the other apparatus.

Further, in the present embodiment, as described above, the print setting information of the printing data of each page included in the printing job is added to the printing job. The main control unit (control unit) 110 determines the page which cannot be printed without changing the attributes of the printing data when input in the same apparatus, among the pages included in the printing job based on the print setting information. The portable memory 500 stores the printing data of the unprintable page determined by the main control unit 110 as the pending job data. The printing unit 107 prints pages excluding the unprintable page determined by the main control unit 110 among the pages included in the printing job. Thereby, the image forming apparatus can specify the printing data to be printed by the printing unit 107 and the printing data to be stored as the pending job data by the portable memory 500 according to a result of the determination of the main control unit 110.

For example, a plurality of image forming apparatuses are installed at an office. However, in a color apparatus in which color image printing is possible or in an A3 size dedicated apparatus in which A3 size printing is possible, the number of installed apparatuses is small, or the use is limited. In this case, for example, if the pages of the A3 size and the A4 size are mixed within the printing job, a certain user may want to selectively print only the page of the A4 size in the image forming apparatus (A4 size dedicated apparatus) apart from the A3 size dedicated apparatus.

However, in the conventional image forming apparatus, the pages included in the printing job are not preserved in units of pages, but are kept pending in units of printing jobs. In other words, when the printing job is carried out in the image forming apparatus (A4 size dedicated apparatus) apart from the A3 size dedicated apparatus, and when the pages of the A3 size and the A4 size are mixed within the printing job, the printing job itself is pending (the printing of all the pages within the printing job is pending). Accordingly, user convenience is low.

In contrast, in the image forming apparatus according to an aspect of the present disclosure, when the unprintable page is included in the printing job, the printable page is selectively printed, so that the convenience of a user can be improved.

The embodiment disclosed herein is illustrative in every respect and should be considered as being non-limiting. The scope of this disclosure is represented by the description of the embodiment as well as the scope of the claims, and furthermore includes meanings equivalent to the scope of the claims and all changes in the scope of the claims.

For example, in the embodiment, the pending job data is stored in the portable memory 500 that is detachably installed on the image forming apparatus 100. However, the present disclosure is not limited thereto, and the pending job data may be stored in the storage unit 112 installed in the image forming apparatus 100. The pending job data may be stored in the user terminal 200 or in the server 300. In this case, the pending job data may be sent to the different apparatus in which the printing based on the pending job data can be carried out via the network NT.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
   an input unit through which printing data of each of pages included in a printing job is input;
   a control unit that determines, on the basis of print setting information of the printing data included in the printing job, (i) a page which is unprintable without changing attributes of the printing data originally inputted in the same apparatus because at least one of toner and paper required for printing is deficient, and (ii) a page which is printable without changing attributes of the printing data, among the pages included in the printing job;
   a printing unit that selectively prints a page excluding the unprintable page determined by the control unit, among the pages included in the printing job;
   a storage device that stores the printing data including the unprintable page determined by the control unit but not including the printable page determined by the control unit, among the printing data of the pages included in the printing job as pending job data;
   a communication unit for connection to a network;
   a reception unit receiving an instruction to carry out printing based on the pending job data; and
   a notification unit having a display unit,
   wherein when the pending job data is stored in the storage device, the notification unit displays a reception screen for receiving an instruction whether or not to cause the same apparatus to carry out the printing based on the pending job data by changing the attributes of the printing data originally inputted;
   when the reception unit receives the instruction to carry out the printing based on the pending job data according to the reception screen, the printing unit carries out the printing based on the printing data obtained by converting an attribute of the pending job data into an attribute by which the printing is allowed in the same apparatus;
   the communication unit obtains information about toner and paper housed in a different apparatus that excludes the same apparatus and is connected to the network;
   when the reception unit receives the instruction not to cause the same apparatus to carry out the printing based on the pending job data according to the reception screen, the control unit determines whether the different apparatus in which the printing based on the pending job data can be carried out without changing the attributes of the printing data originally inputted is present or not, based on the information about toner and paper and the print setting information; and
   when the control unit determines that the different apparatus in which the printing based on the pending job data can be carried out is present, the notification unit displays a notification screen notifying that the different apparatus in which the printing based on the pending job data is allowed to be carried out is present, together with an identifier of the different apparatus, an installation site of the different apparatus, and the information about toner and paper.

2. The image forming apparatus according to claim 1, wherein, when the printing unit carries out double-side printing, if the page to be printed on one side is printable without changing the attributes of the printing data inputted in the same apparatus, and the page to be printed on the other side is unprintable without changing the attributes of the printing data inputted in the same apparatus, the storage device stores the printing data of each of the page to be printed on one side and the page to be printed on the other side as the pending job data.

3. The image forming apparatus according to claim 1,
   further comprising a connection unit for connection to a portable memory that is removed from the connection unit and is allowed to be connected to the different apparatus,
   wherein when the different apparatus in which the printing based on the pending job data can be carried out is present, the control unit stores the pending job data in the portable memory without outputting the pending job data the printing unit.

4. The image forming apparatus according to claim 1, wherein the storage device stores print setting information of the printing data of the unprintable page as the pending job data in addition to the printing data of the unprintable page.

5. The image forming apparatus according to claim 1, wherein the notification unit displays a message requesting supplementation of the toner when the toner required for the printing based on the pending job data is insufficient in the different apparatus, and displays a message requesting supplementation of the paper when the paper required for the printing based on the pending job data is insufficient in the different apparatus.

6. The image forming apparatus according to claim 1, wherein the notification unit displays a information indicating that a print settings of the pending job data will be changed when the printing based on the pending job data is carried out in the notification screen.

7. The image forming apparatus according to claim 1, wherein the notification unit displays the reception screen and the notification screen within same screen.

8. The image forming apparatus according to claim 1, wherein the notification unit displays the reception screen on the display unit again, when the control unit determines that the different apparatus in which the printing based on the pending job data can be carried out without changing the attributes of the printing data originally inputted is unavailable, after the reception unit has received, according to the reception screen, the instruction not to cause the same apparatus to carry out the printing based on the pending job data by changing the attributes of the printing data originally inputted.

* * * * *